(12) United States Patent
Visconti et al.

(10) Patent No.: US 6,834,883 B2
(45) Date of Patent: Dec. 28, 2004

(54) AIR BAG HOUSING AND METHOD OF MAKING

(75) Inventors: Carl H. Visconti, Clarkston, MI (US); Ryan T. Pinsenschaum, Vandalia, OH (US); Steven A. Damian, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 185 days.

(21) Appl. No.: 10/095,742

(22) Filed: Mar. 12, 2002

(65) Prior Publication Data

US 2002/0175443 A1 Nov. 28, 2002

Related U.S. Application Data

(60) Provisional application No. 60/293,024, filed on May 23, 2001.

(51) Int. Cl.[7] ................................................ B60R 21/20
(52) U.S. Cl. ..................................... 280/728.2; 280/732
(58) Field of Search .......................... 280/728.2, 728.3, 280/731, 732, 728.1

(56) References Cited

U.S. PATENT DOCUMENTS

| | | | |
|---|---|---|---|
| 3,793,108 A | 2/1974 | Goldsworthy ................ | 156/180 |
| 4,394,338 A | 7/1983 | Fuwa .......................... | 264/135 |
| 4,479,998 A | 10/1984 | Belbin et al. ............... | 428/220 |
| 5,358,270 A | * 10/1994 | Kuretake et al. .......... | 280/728.2 |
| 5,431,436 A | * 7/1995 | Mossi et al. ................ | 280/732 |
| 5,454,586 A | * 10/1995 | Rogerson .................. | 280/728.2 |
| 5,511,819 A | * 4/1996 | Spilker et al. ............. | 280/728.2 |
| 5,540,797 A | 7/1996 | Wilson ........................ | 156/180 |
| 5,647,608 A | * 7/1997 | Damman et al. .......... | 280/728.2 |
| 5,722,684 A | * 3/1998 | Saderholm et al. ....... | 280/728.3 |
| 5,788,266 A | 8/1998 | Rose et al. ................ | 280/728.2 |
| 6,286,858 B1 | 9/2001 | Shepherd et al. | |
| 6,331,015 B1 | 12/2001 | Doxey et al. | |
| 6,361,064 B1 | 3/2002 | Hopf et al. | |
| 6,422,589 B1 | 7/2002 | Ostermann et al. | |
| 6,435,541 B1 | 8/2002 | Thomas et al. | |
| 6,626,455 B2 | 9/2003 | Webber et al. | |
| 6,656,316 B1 | * 12/2003 | Dyksterhouse ............ | 156/285 |

FOREIGN PATENT DOCUMENTS

| | | | | |
|---|---|---|---|---|
| GB | 2220013 A | * | 12/1989 | ........... B29C/47/88 |
| JP | 55032676 A | * | 3/1980 | ............. B29F/3/00 |

* cited by examiner

*Primary Examiner*—Peter C. English
(74) *Attorney, Agent, or Firm*—Scott A. McBain

(57) ABSTRACT

A method for manufacturing a passenger airbag housing using a continuous flow or constant cross-section process, the process will enable maximum design flexibility when multiple materials are capable of being used. The method will have a short design and tooling lead-time providing lean processing and a common footprint over a family of designs. A method of structurally reinforcing a passenger air bag housing by inserting a structural member into the continuous flow or constant cross-section process.

20 Claims, 5 Drawing Sheets

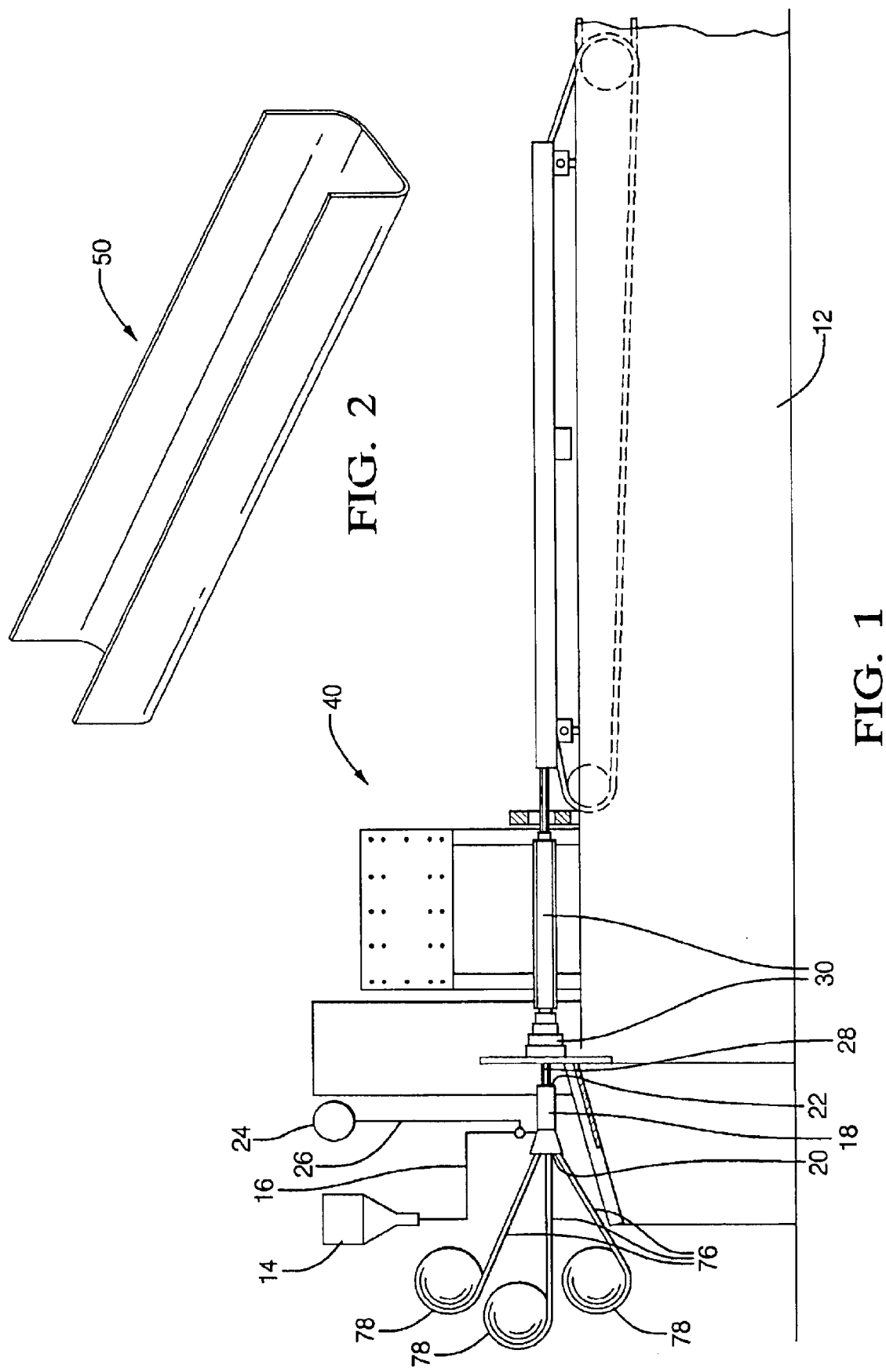

AIR BAG HOUSING AND METHOD OF MAKING

CROSS REFERENCE TO RELATED APPLICATIONS

This application claims the benefit of U.S. provisional application Ser. No. 60/293,024 filed on May 23, 2001, the contents of which are incorporated herein by reference thereto.

TECHNICAL FIELD

The present application relates to air bag housings and their method of manufacture. More particularly, the present application is related to passenger side air bag housings.

BACKGROUND

Current passenger airbag (PAB) housings/reaction canisters are produced using many different processing methods and materials. One type is a stamped steel housing with end caps being welded on. Another type is an extruded aluminum housing with end caps being mechanically attached thereto. Still another type is an injection molded glass-reinforced thermoplastic housing.

There is a continuing need for a method of manufacturing a passenger airbag housing in a quick and efficient manner while also meeting the necessary structural requirements and features.

SUMMARY

A method for manufacturing a passenger airbag housing using a continuous flow or constant cross-section process, the process will enable maximum design flexibility while having a short design and tooling lead-time providing lean processing and a common footprint over a family of designs.

The above-described and other features and advantages of the present invention will be appreciated and understood by those skilled in the art from the following detailed description, drawings, and appended claims.

BRIEF DESCRIPTION OF THE DRAWINGS

FIG. 1 is a side elevational view of a machine capable of forming an article using a pultrusion process in accordance with an exemplary embodiment of the present invention;

FIG. 2 is a perspective view of an item molded using a method of manufacturing in accordance with an exemplary embodiment;

DESCRIPTION OF THE PREFERRED EMBODIMENT

Figure 3:
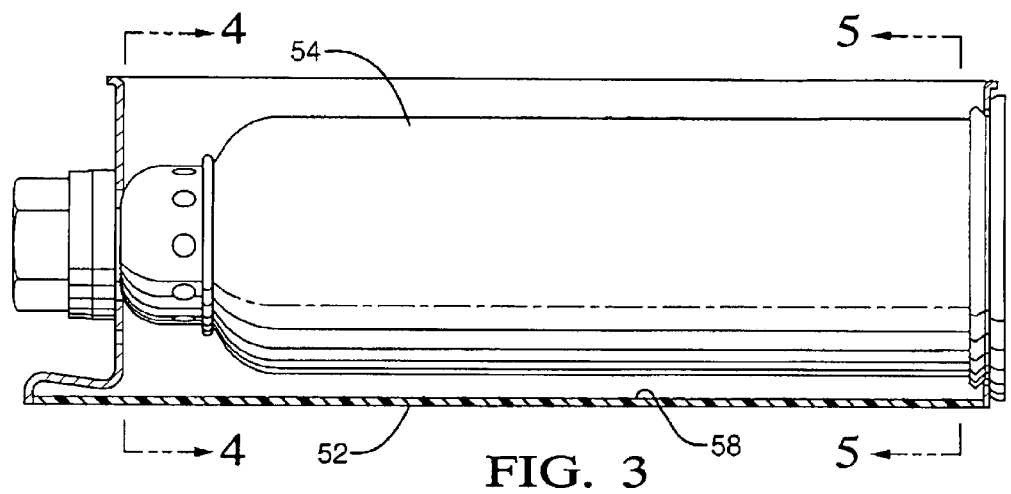
FIG. 3 is a cross sectional view of an air bag housing formed in accordance with a process of the present invention.
Figure 4:
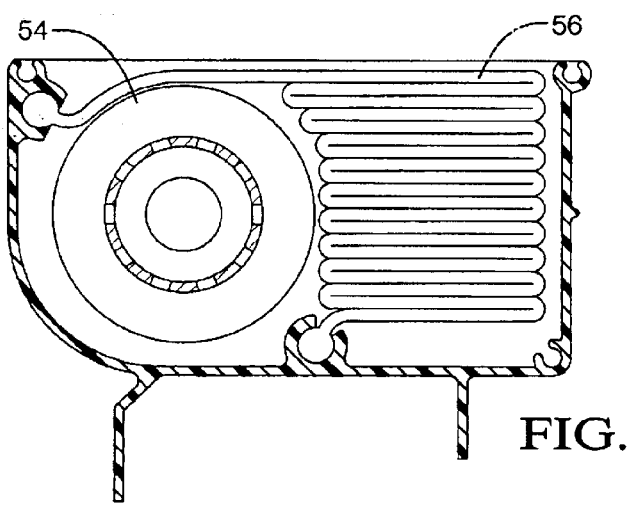
FIG. 4 is a view along lines 4—4 of FIG. 3.
Figure 5:
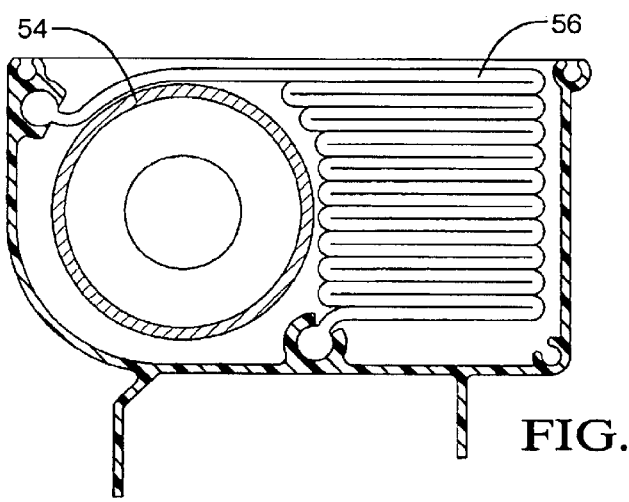
FIG. 5 is a view along lines 5—5 of FIG. 3.

A passenger air bag housing is formed using a continuous or constant flow process wherein an elongated member having a cross-section for a passenger side air bag housing is formed. The continuous or constant flow process allows the housing to be manufactured from multiple materials of varying characteristics thus, certain structural materials and/or qualities are capable of being added into the materials being used to form the air bag housing.

Referring now to FIG. 1, a pultrusion machine generally indicated by reference character 10 is illustrated. Pultrusion machine 10 includes a bed 12 upon which various portions of the apparatus are mounted. A liquid thermoplastic material is fed from a reservoir or feeder 14. Feeder 14 supplies liquid thermoplastic material to a feed line 16, the feed line 16 is in fluid communication with a mixing or composing tube 18. Composing tube ii has an input end 20 and an export end 22.

As an alternative to the liquid thermoplastic material, pellitizied thermoplastic material is fed by feeder 14 and composing tube 18 providing a means for heating and melting the thermoplastic material.

As the liquid thermoplastic material is fed into tube 18 a liquid hardener, if necessary, is fed from a reservoir 24 through a feed line 26. The hardener may be required for liquid resin materials. The hardener is fed, as shown, or directly into composing tube 18. The liquid hardener is fed in a sufficient amount such that a suitable amount of the hardener, namely a catalyst, is fed and mixed with the resin and liquid mixture.

Stiffening or structural members, as will be more filly discussed herein, are fed into input end 20 during the pultrusion process. As contemplated herein, glass bundles, carbon fibers, steel cables/wires and/or steel members are examples of some types of materials capable of being used to provide structural enhancement in accordance with the methods of the present disclosure.

A fully mixed or supplement material 28 (e.g. thermoplastic material combined with structural support materials) is then passed through export end 22 and ultimately to a die 30. Die 30 is configured to provide the shape or cross section of the molded article as well as a source of heat for curing the pultruded article. In an exemplary embodiment, die 30 is an elongated member having two complimentary die halves or molds which provide a source of heat for curing the pultruded article as well as a mold for the product configuration.

Examples of pultruded articles include liners and other items including but not limited to the following: tool handles, mine shaft bolts, pipes, tubing, channels, beams, fishing rods and the like. In some applications a pultruded core is surrounded by a molded outer cladding layer formed of a reinforced resin.

A pultrusion process involves pulling material through an elongated heated die which at least partially cures, and therefore stiffens, the pultruded article.

In accordance with an exemplary embodiment of the present disclosure, and referring now to FIGS. 1–6, a pultrusion process is employed to produce a constant cross-section thermoplastic composite housing body 50 having "U" shape configuration. The "U" shape configuration defines an upper opening through which an air bag is deployed therethrough.

The contemplated use for housing body 50 is to provide a piece of stock material from which a housing 52 is cut.

Figure 6:
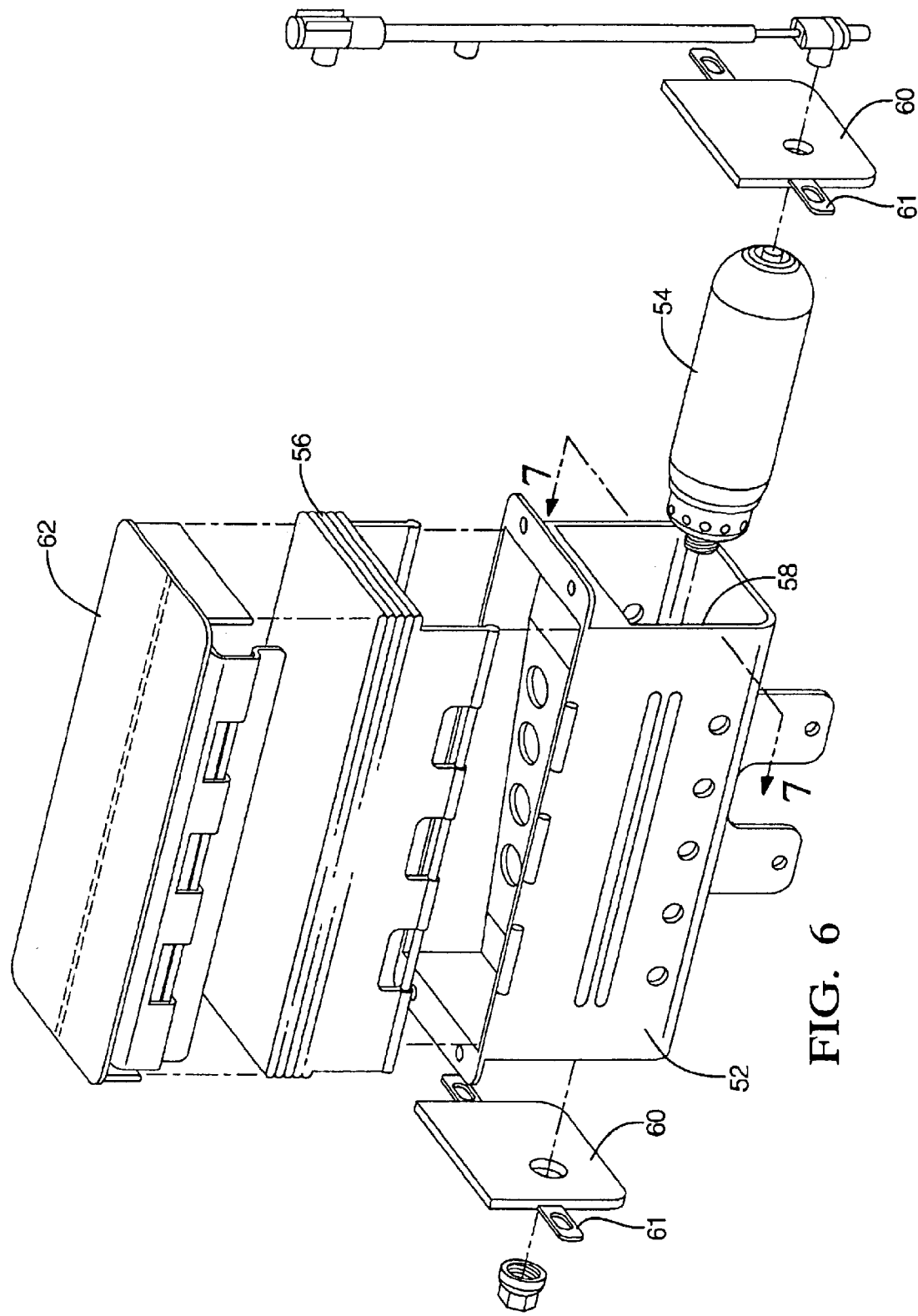
FIG. 6 is an exploded view of a passenger air bag device.

Referring now to FIG. 6 housing 52 is configured for use as a housing for a passenger side air bag module. The passenger side air bag module includes an inflation device 54 for inflating means for inflating an inflatable airbag 56. Inflatable air bag 56 is installed within a cavity 58. Cavity 58 is defined by the configuration of housing 52.

In accordance with an exemplary embodiment, composite housing body 50 is formed by a pultrusion process wherein an elongated member is formed and a plurality of housings 52 are cut from the composite housing body 50. Accordingly, the pultrusion process reduces costs and waste materials by producing a single element in a single step that is capable of providing multiple components of varying length. Accordingly, a family of housings 52 each having a similar configuration or cross-section can be cut from a single extrusion. Thus, each of the cut housings can be configured to have differing lengths while all of the cross sections remain the same. Accordingly, the housings of various lengths with a similar cross-section are all produced from a single pultrusion process.

In accordance with one embodiment, each housing 52 is cut from the housing body as it is formed and protrudes out of the machinery. In this process, the individual size of each item is determined by the length of the housing material allowed to pass from the machine before it is cut. The cutting process is capable of being controlled by an operating system having a computer algorithm for controlling a cutting means such as a knife or blade or other means for cutting the material of housing 52. The controller will also monitor the length of material passing through and/or the amount of materials being fed into the machine. Accordingly, the controller is capable of monitoring and varying the speed at which the material is formed or cut.

As an alternative, the housing body is formed first, cooled and the housings are cut from the elongated housing body after the forming process. For example, a 10 foot length of housing body 50 is formed and cooled later, and then the ten foot section can be used to supply two housings having a length of three feet and a third housing having a length of four feet. This is particularly advantageous for items having a similar cross-sectional configuration.

This process enables maximum design flexibility while having a short design and tooling lead-time. The tooling lead-time is short as the tooling process is only performed once since the cross-section of the housing is universal to all of the various designs or lengths.

In a first embodiment or configuration, airbag housing 52 is formed by a pultrusion process, wherein bundles of glass fibers are pulled through a bath of liquid plastic (e.g. thermoset) and is passed through a mold having the desired configuration. Accordingly, the airbag housing 52 is formed using a pultrusion process and metal end caps with attachment features are secured to the ends of the housing during assembly. The end caps are secured in one embodiment by passing securement means through openings in the end caps. The securement means is received in features formed in the housing body. For example, and referring now to FIG. 6 and during the assembly of the air bag module the inflator, diffuser and inflatable cushion are inserted and secured into cavity 58. Once the required components of the air bag module are inserted and secured within cavity 58, a pair of end caps 60 are secured to the housing.

Alternatively, a first end cap is secured to the housing prior to the insertion of the internal components and the second end cap is secured after the internal components have been inserted and secured within the housing (e.g. inflator, airbag etc.).

In accordance with an exemplary embodiment end caps 60 are metal (e.g. steel or aluminum) with securement features 61 for providing a means for attaching the housing to a vehicle. End caps 60 are stamped or formed in accordance with known manufacturing methods. End caps 60 are secured to housing 52 through securement means including but not limited to the following: threaded attachments; vibration welding; ultrasonic welding; heat staking; and adhesives, etc. Once the end caps and the internal components are secured to the housing, a protective covering 62 is secured to the housing. Protective covering 62 is received with securement features formed into housing 52.

FIG. 6 illustrates one example of a passenger side air bag assembly. It is, of course, contemplated that various configurations and arrangements are contemplated for use with the housings formed in accordance with the present invention.

As an alternative, one end cap 60 can be molded onto housing 52 by overmolding a long-glass fiber reinforced thermoplastic end and adding other features as applicable. In this process one end of the housing is inserted into the mold and the end cap is molded directly onto the housing. In this embodiment, the second end cap is secured using traditional methods (e.g. threaded attachments, vibration welding, ultrasonic welding, heat staking, adhesives, etc.) after the components of the air bag module are inserted and secured either axially or vertically within cavity 58.

Figure 7:
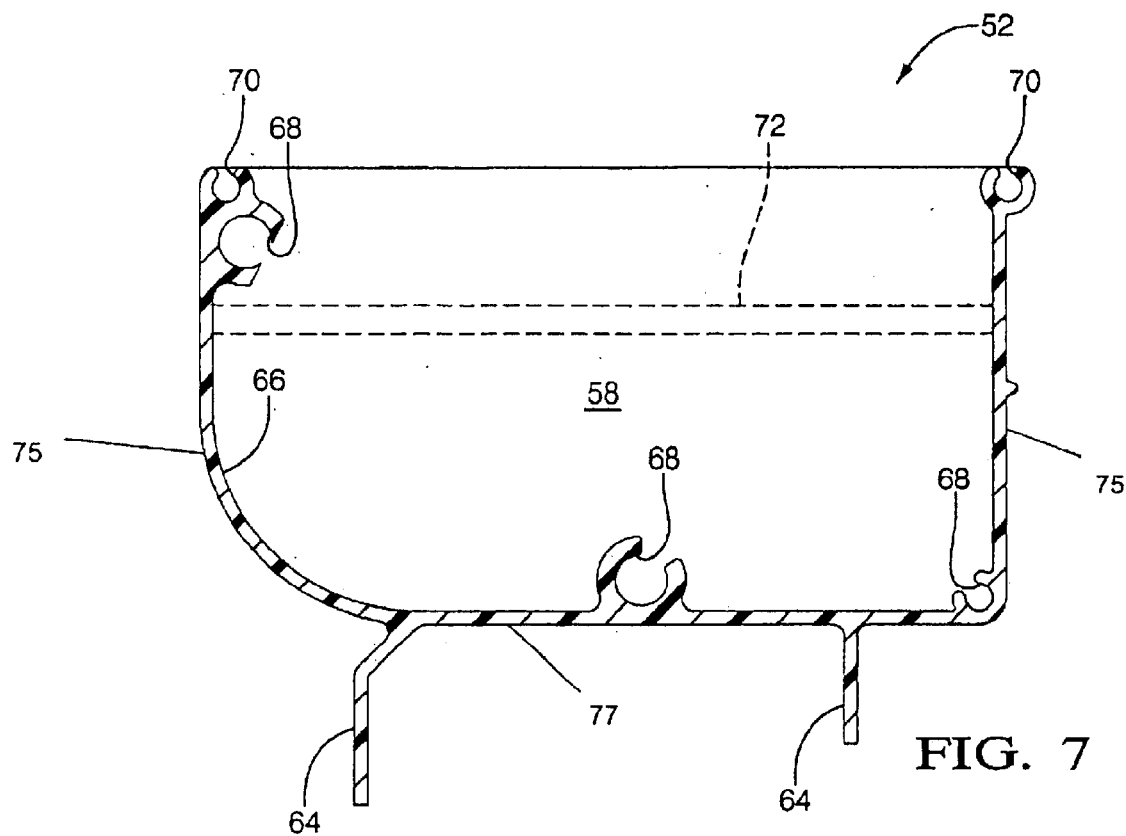
FIG. 7 is a cross sectional view of an air bag housing formed in accordance with a process of the present invention.

Referring now to FIG. 7, an end view of housing 52 is illustrated. Housing 52 includes securement flanges 64 which are integrally molded into housing 52. Securement flanges 64 have a plurality of openings for receiving a stud to secure the housing to a cross car structured beam. In addition, an inner surface 66 of housing 52 includes a plurality of securement features 68. Features 68 are configured for use in the securement of the inflator within the air bag module. Housing 52 is also molded with integral securement features 70 configured for engaging a portion of protective cover 62. Features 68 also provide a means for securing the periphery of an opening of an inflatable air bag to the housing wall. For example, an opening is secured into the periphery of the air bag opening. The opening is inserted into the feature and a retaining rod is axially inserted into the opening of the air bag which is inserted into the opening of the feature. The feature is configured to allow for axial insertion of the retaining rod; however, the rod will not pull out of the feature as the air bag inflates.

In addition, and as an alternative, housing 52 is molded with an interior wall 72 defining an inflator cavity and an airbag cavity the interior wall having a plurality of diffuser openings. The diffuser openings provide fluid communication of the inflator gas of the inflator for inflating the airbag. Alternatively, interior wall 72 is inserted along with all of the other components.

Figure 8:
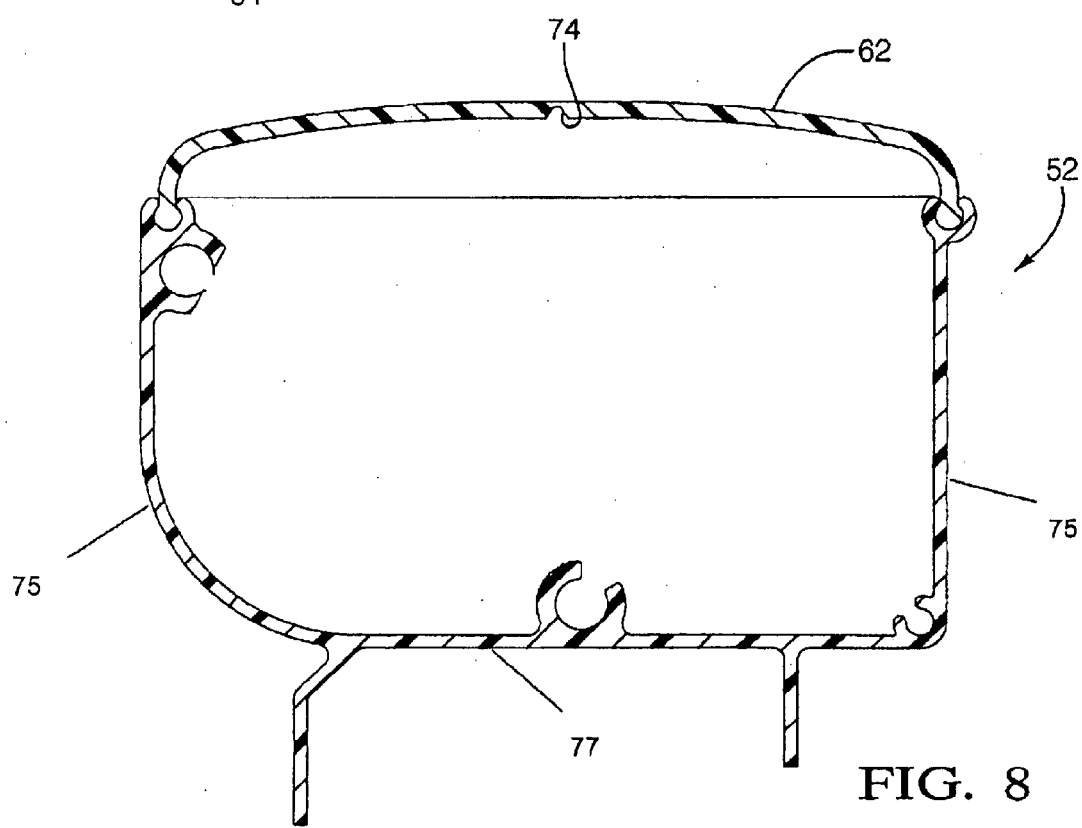
FIG. 8 is a cross sectional view of an air bag housing formed in accordance with an alternative process of the present invention.

As another alternative, and referring now to FIG. 8, housing 52 is integrally molded with protective cover 62. Protective cover 62 includes a tear seam 74 that facilitates the breaking of protective cover 62 as the inflatable airbag is deployed.

Figure 9:
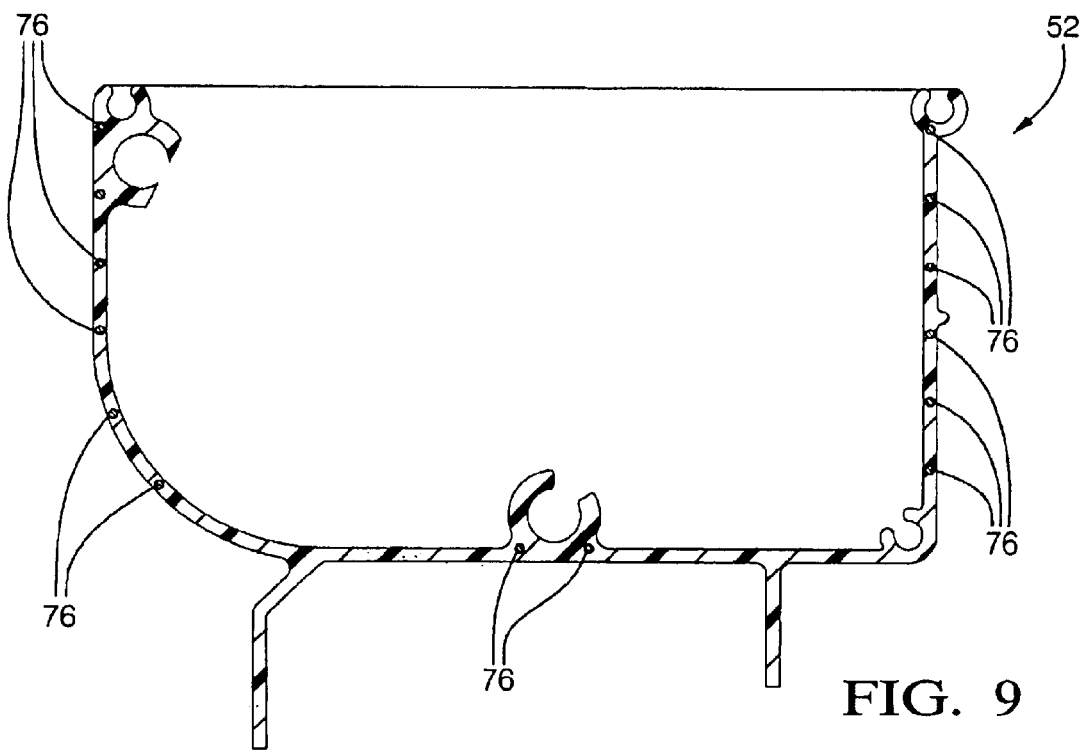
FIG. 9 is a cross sectional view of an air bag housing formed in accordance with an alternative process of the present invention.

Referring now to FIG. 9 an alternative embodiment of the present invention is illustrated. Here housing 52 is formed using a pultrusion process wherein a plurality of reinforcing steel wires and/or cables 76 are fed into the die for forming housing 52. Cables 76 are fed from spools 78 as housing 52 is formed (FIG. 1). Steel wires 76 are positioned into high stress areas of housing 52, for example areas that encounter high stresses during air bag deployment (e.g. due to inflator gas output). Accordingly, and through the use of supplemental support (e.g. steel wires and or cables) disposed directly within the side walls 75 and bottom 77 of the housing there is no requirement for additional thermoplastic material (e.g. thickening) of the housing walls in order to provide the required structural requirements.

In accordance with this embodiment, a selectively placed continuous steel wire or cable is provided in one or more places along the housing to increase housing strengths and performance related to structural needs of the housing.

As a further alternative and in order to facilitate the movement of the wire through the pultruded housing the wire or cable is preheated using induction heating. Thus, the pre-heating of the wire allows ease of insertion within the walls of the housing.

Figure 10:
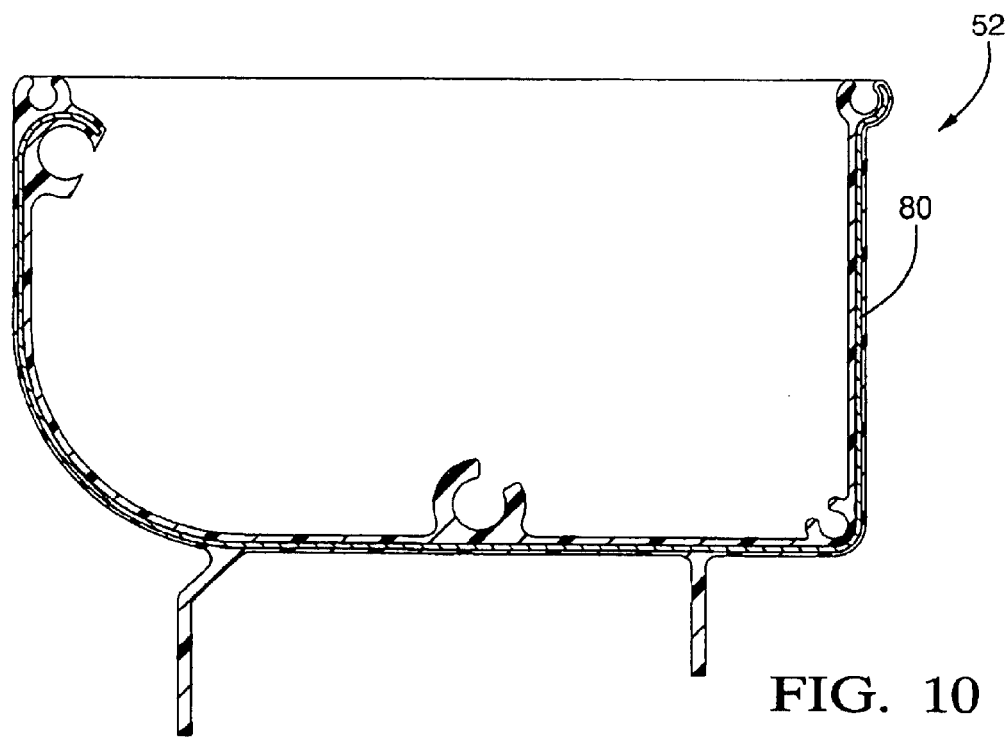
FIG. 10 is a cross sectional view of an air bag housing formed in accordance with an alternative process of the present invention.

As another alternative, and as illustrated in FIG. 10, housing 52 is formed with a pultrusion process wherein a roll-formed metal section 80 is continuously fed into pultrusion machine 10. In this embodiment the roll-formed metal section is first formed and then fed into the machine performing the pultrusion process.

As illustrated in FIG. 10 the steel section is found to have a similar cross section as housing 52. In addition, and as an alternative, the steel section is configured to provide structural support to the securement features of housing 52.

As yet another alternative, housing 52 is formed using an extrusion process (e.g. wherein the item is molded with a high plastic content and the material is pushed through a die). In this alternative housing 52 is formed using an extrusion process and the end caps are secured after the air bag module components are installed therein. In addition, the housing formed by the extrusion process of this embodiment is also capable of being formed with steel wire or cables or a roll formed steel section. As contemplated herein the roll-formed metal section 80 and/or the cables 76 are continuously fed during the extrusion process.

During extrusion a pre-heated cable or wire is pushed or pulled through specific areas of the part.

In any one of the aforementioned processes one end cap 60 is produced by overmolding and the second end cap is attached using traditional methods (e.g. threaded attachments, vibration welding, ultrasonic welding, heat staking, adhesives, etc.) after the components of the air bag module are inserted and secured within cavity 58.

As yet another alternative housing 52 is formed through the co-extrusion of the passenger airbag housing body with the protective cover and tear seams and flexible hinging.

Another alternative is to simultaneously extrude the housing body and the protective cover or alternatively initially extrude the housing body with selectively placed fibers or fiber cables. Any of the aforementioned methods can be combined with the metal rolled form section.

In addition, it is noted that the protective cover is capable of being extruded with the same material as the housing or possibly a second material of differing characteristics for example, characteristics relating to the deployment of the protective cover as opposed to the structural requirements of housing 52. Accordingly, the present invention is directed to a method for manufacturing an airbag housing in accordance with any of the aforementioned processes or combinations thereof. For example, a housing can be formed by initially pultruding the housing body with selectively placed fibers or fiber cables and that the housing is then combined with the metal rolled form section. Furthermore, a housing is capable of being extruded with integral attachment of the protective cover using a second or similar material.

Another combination would be to extrude the housing with or without steel wire or cable or rolled form steel sections.

Still yet another alternative would be the extrusion of the housing with long glass fiber reinforced thermoplastic and the inclusion of selectively placed continuous steel wire or cable in one or more places along the section to increase housing performance related to the structural needs of the housing.

As an alternative to the aforementioned process, it is possible to extrude to the section with a roll-formed metal section.

In yet another alternative, the housing is formed through the extrusion of aluminum with a steel wire and/or cable added therein.

In yet another alternative, the housing is extruded to form an aluminum section with design changes for added steel wire/cable and then the cable is selectively placed in one or more places along the extruded section.

Still yet another alternative is the extrusion of the section from aluminum with a roll-informed steel section. The roll-form steel section is molded into the extruded aluminum section during the extrusion process.

In yet another alternative, the housing is formed using a roll forming process (similar to roll forming associated with structural bending/Columbus) to produce the main cross-sectional component of housing.

For all the processes that include roll forming with an integral diffuser wall a continuous punching operation is used to form the gas diffusion openings. In this embodiment, and through the use of a single synchronize punch, it would be possible to vary the diffuser opening size to tailor dispersion of gas during deployment.

For all continuous flow constant cross-section designs the end caps are configured to have body/cross beam attachment features for securing the module to the vehicle and in particular the vehicle frame. This feature provides the housing with the required structural rigidity desired for vehicular applications.

This feature provides a means for structural attachment of the inflator housing to the vehicle in order to meet design requirements and/or parameters. This also provides the ability to produce a family of passenger airbag housings using a common housing body cross-section wherein the securement features are uniform across the entire design.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An elongated housing for use in a passenger air bag module, comprising:

a pair of sidewalls and a bottom defining an internal cavity, said internal cavity having an opening configured to allow an inflatable cushion to deploy from said internal cavity;

a plurality of securement features formed in the housing;

a plurality of steel cables disposed within said pair of sidewalls, said plurality of steel cables being located proximate to said plurality of securement features during a process for forming the housing, wherein there is no thickening of said pair of sidewalls and bottom proximate to said plurality of steel cables.

2. The housing as in claim 1, wherein the process for forming the housing is a pultrusion process.

3. The housing as in claim 1, wherein the process for forming the housing is an extrusion process.

4. The elongated housing as in claim 1, wherein the process for forming the housing comprises the steps of:

forming said housing using a continuous flow process, wherein said continuous flow process provides said housing with a constant cross-sectional configuration.

5. The elongated housing as in claim 4, wherein the housing has a common configuration for use in a family of designs.

6. The elongated housing as in claim 4, wherein said continuous flow process is a pultrusion process.

7. The elongated housing as in claim 4, wherein said plurality of cables are fed into said housing as it is being formed by said continuous flow process.

8. the elongated housing as in claim 4, wherein said internal cavity has a channel shape configured for receiving and engaging components of an airbag module.

9. The elongated housing as in claim 1, wherein one of said plurality of securement features is a securing member depending away from said housing.

10. The elongated housing as in claim 1, wherein one of said securement features receives a portion of a cover of said housing.

11. The housing as in claim 1, wherein the process for forming the housing includes the step of preheating said plurality of steel cables by induction heating prior to their inclusion in said housing and said housing is formed with a thermoplastic material.

12. The housing as in claim 11, wherein said housing further comprises a protective cover and wherein said process is an extrusion process.

13. A housing for an airbag module, comprising: a pair of opposing sidewalls and a bottom member disposed therebetween, said pair of opposing sidewalls and said bottom member defining an internal cavity, said housing being formed from a continuous flow process that allows the housing to be manufactured from multiple materials, wherein a continuous structural material is added to said pair of opposing sidewalls and said bottom member during said continuous flow process, said continuous structural material extending along the length of said housing, wherein said continuous structural material is a plurality of steel cables disposed within said pair of opposing sidewalls, said plurality of steel cables being located proximate to a plurality of securement features of said housing during said continuous flow process, wherein there is no thickening of said pair of opposing sidewalls and said bottom proximate to said plurality of steel cables.

14. The housing as in claim 13, wherein said continuous flow process is a pultrusion process wherein said pair of opposing sidewalls and said bottom member are formed from a thermoplastic material.

15. The housing as in claim 14, wherein said continuous flow process includes the step of preheating said plurality of steel cables prior to their inclusion in the thermoplastic material.

16. The housing as in claim 13, wherein said housing further comprises an interior wall with a plurality of openings, said interior wall being disposed in said internal cavity and defining an inflator cavity and an airbag cavity within said internal cavity.

17. The housing as in claim 13, wherein said housing further comprises a protective cover.

18. The housing as in claim 13, wherein said continuous flow process includes the step of preheating said plurality of steel cables prior to their inclusion in said housing.

19. The housing as in claim 18, wherein said plurality of steel cables are preheated by induction heating.

20. The housing as in claim 13, wherein said housing further comprises a protective cover and wherein said continuous flow process is an extrusion process.

* * * * *